(12) United States Patent
Simpson

(10) Patent No.: US 6,771,755 B1
(45) Date of Patent: Aug. 3, 2004

(54) PERSONALIZED CALLER IDENTIFICATION IN A TELEPHONE NETWORK

(75) Inventor: Anita Hogans Simpson, Decatur, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 88 days.

(21) Appl. No.: 09/727,321

(22) Filed: Nov. 30, 2000

(51) Int. Cl.[7] .............................................. H04M 1/56
(52) U.S. Cl. .............................. 379/142.04; 379/142.01
(58) Field of Search ....................... 379/142.01, 211.01, 379/221.08, 207.02, 207.13, 142.03, 142.04, 142.06, 142.09, 142.17

(56) References Cited

U.S. PATENT DOCUMENTS

| | | | | |
|---|---|---|---|---|
| 5,278,895 A | * | 1/1994 | Carlson ....................... | 379/145 |
| 5,430,719 A | | 7/1995 | Weisser, Jr. ................. | 370/58.2 |
| 5,784,444 A | * | 7/1998 | Snyder et al. .......... | 379/142.01 |
| 5,864,612 A | * | 1/1999 | Strauss et al. .......... | 379/142.03 |
| 5,903,636 A | * | 5/1999 | Malik ..................... | 379/142.01 |
| 6,137,870 A | * | 10/2000 | Scherer .................. | 379/127.06 |
| 6,192,116 B1 | * | 2/2001 | Mayak ................... | 379/142.08 |
| 6,310,944 B1 | * | 10/2001 | Brisebois et al. ....... | 379/142.01 |
| 6,397,059 B1 | * | 5/2002 | Vance et al. ................. | 455/415 |

* cited by examiner

Primary Examiner—Curtis Kuntz
Assistant Examiner—Barry W Taylor
(74) Attorney, Agent, or Firm—Woodcock Washburn LLP

(57) ABSTRACT

A personalized caller ID service is provided. A subscriber to the service who is calling his own telephone line from a remote location may enter a personal identification number (PIN) after dialing the subscriber's telephone number. A database within the telephone network stores a text message along with the PIN, where the text message is preferably composed by the subscriber at the time of enrollment in the personalized caller ID server. When the PIN is entered, the text message is retrieved from the database and transmitted to the subscriber's caller ID equipment during call termination for display on that equipment. The invention may be embodied in an Advanced Intelligent Network (AIN), wherein a termination attempt trigger (TAT) is provisioned on the subscriber's line. Upon actuation of the trigger, the service control point within the AIN instructs the service switching point that services the caller's line to prompt the caller for a PIN and collect the PIN digits.

22 Claims, 4 Drawing Sheets

| CdPN | PIN | Text |
|---|---|---|
| 404-555-2222 | 5678 | Mom is calling |
| 404-555-2222 | 8765 | Dad is calling |
| 404-555-2222 | 1250 | Rhonda is calling |
| 404-555-2222 | 4038 | Daniel is calling |

304a

PERSONALIZED CALLER IDENTIFICATION IN A TELEPHONE NETWORK

SUMMARY OF THE INVENTION

The present invention provides a personalized caller ID service in which a subscriber may identify himself when he calls his own telephone number from a remote location, so that an indication of the subscriber's identity may be displayed on the subscriber's caller ID equipment. When a subscriber to the service calls his own telephone number, he enters a personal identification number (PIN) during the ringing tone. Entry of the PIN causes the system to retrieve a personalized message from data storage and to transmit that message to the subscriber's caller ID equipment at the time the call is terminated to the subscriber's line. For example, the message may read "Dad is calling." Thus, when a subscriber calls his children at home from a payphone and enters his PIN, instead of seeing the calling number identified as "payphone" the children will see that "Dad is calling," and thus will know that it is safe to answer the phone.

The message that is displayed in response to the PIN is preferably a personalized message that is selected by the subscriber at the time that he subscribes to the personalized caller ID service. The PIN is either selected by the subscriber or assigned by the telephone network provider. A database stores a record for the subscriber's directory number, which contains a correlation between the PIN and the personalized text message.

When the invention is implemented in an advanced intelligent network (AIN), a termination attempt trigger (TAT) may be provisioned on the subscriber's line at a service switching point (SSP) that services the subscriber's line. Whenever a call is placed to the subscriber's line, the TAT triggers a query to a service control point (SCP) which hosts the database that maintains the list of PINs and messages. The SCP determines that the personalized caller ID service is provisioned for the subscriber and instructs the SSP to generate an audio prompt for a DTMF (dual-tone multi-frequency) PIN. The prompt may comprise the familiar ringing tone, thus allowing the prompt to be transparent to third-party callers who are unaware that the subscriber uses the personalized caller ID service. If the subscriber is calling his own number, he may enter his PIN using the touch-tone keypad at the telephone station. When the PIN is received, the SCP looks up the

FIELD OF THE INVENTION

The present invention relates generally to the field of telephony, and, more particularly, to a system and method for providing a personalized caller identification service.

BACKGROUND OF THE INVENTION

Caller identification ("caller ID") services allow a called party to determine the source of the call before answering the telephone. In order to use a caller ID service, a customer of a telephone network subscribes to the caller ID service and purchases caller ID equipment. When a call is terminated at the subscriber's line, the network provides data which includes the directory number of the line from which the call originated, and the record name of the party associated with that number. By using such a service, the subscriber is able to decide whether or not to answer the phone based on who is calling.

While caller ID services are useful tools for screening calls (e.g., unwanted sales calls), the disadvantage of such systems is that they are predicated on the assumption that the caller can always be identified by the particular telephone station from which he or she places the call. This assumption does not hold in the case where a caller places a call at a payphone, a hotel, or other location that is unlikely to be familiar to the calling party. For example, parents may instruct their children not to answer the phone for strangers. However, if a parent attempts to call the children from an unknown location (e.g., a payphone), the children will conclude (incorrectly) that a stranger is calling, and will not answer the phone.

In view of the foregoing, there is a need for a caller ID system and method that overcomes the drawbacks of the prior art. subscriber's record in the database and compares the entered PIN to the PIN listed in the database. If the entered PIN matches the PIN in the database, the subscriber's personalized message is inserted into the CNAM field of the data that is transmitted to the subscriber's caller ID equipment, so that the personalized message may be displayed on the caller ID equipment.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Overview of an Exemplary Telephone Network

Referring now to the figures, a preferred embodiment of the system and method of the present invention will be described. Basic telephony concepts and terminology are used throughout the description as would be understood by one of skill in the art.

Figure 1:
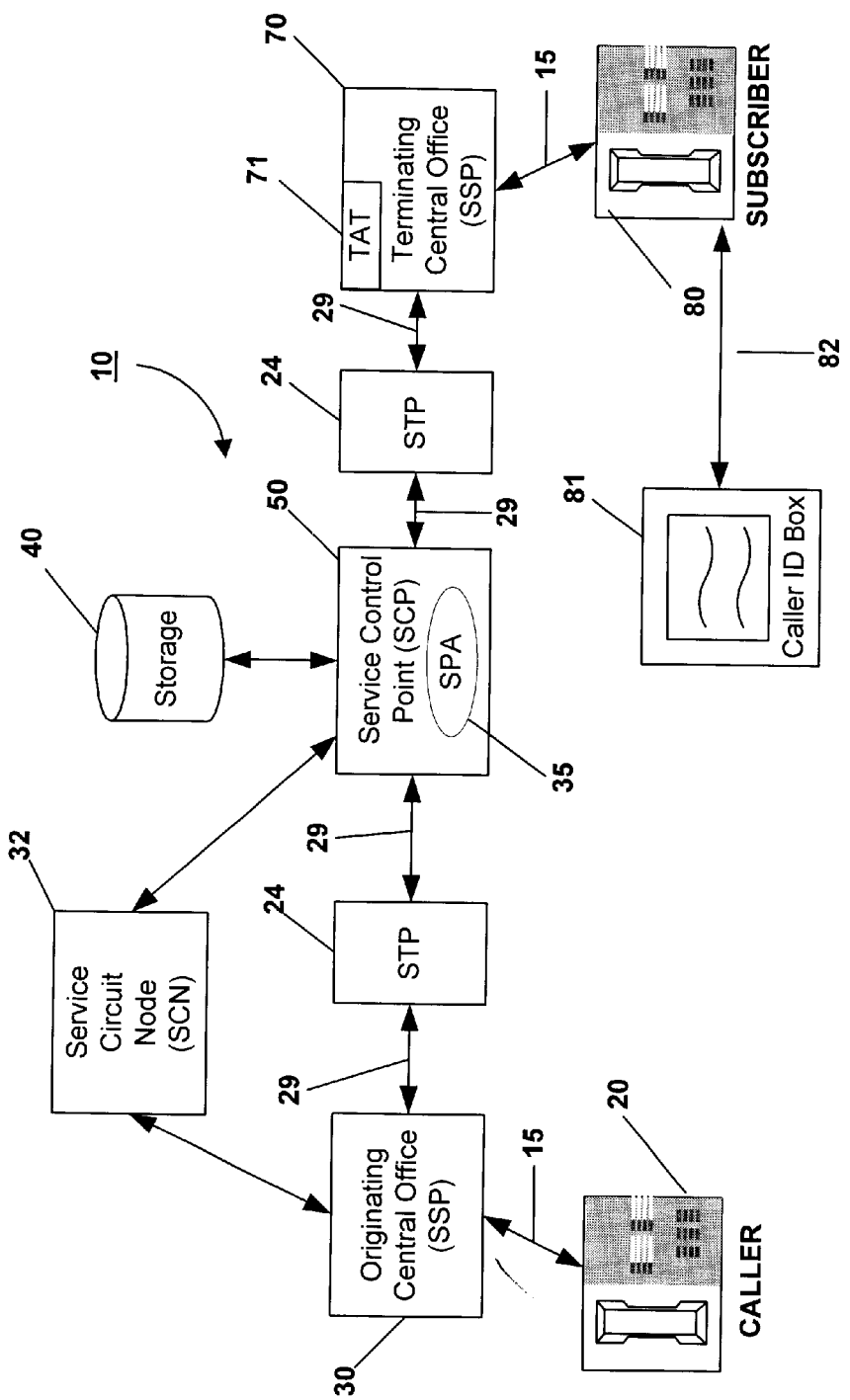
FIG. 1 is a block diagram of an exemplary telephone network in which aspects of the invention may be implemented.

Referring now to FIG. 1, there is shown an exemplary telecommunications network 10 that connects a call between a caller 20 and a subscriber 80 in accordance with the present invention. This exemplary environment is the public switched telecommunications network (PSTN). A portion of the PSTN is illustrated in FIG. 1 and generally described below.

In particular, the detailed portion of the PSTN illustrates a part of the AIN of a typical local exchange carrier. For brevity, only a basic explanation of the PSTN is provided herein. Where the PSTN operates or is composed differently in an important aspect from that which would be understood by those skilled in the art, additional details are provided herein. For further information regarding the referenced PSTN and AIN aspects thereof, the interested reader is referred to the patent to Weisser, U.S. Pat. No. 5,430,719, which is incorporated herein by reference.

The AIN includes a variety of interconnected network elements. A group of such network elements includes the plurality of central offices 30, 70 which are service switching points (SSPs). A central office or SSP is a switch and the terms are used interchangeably herein. As further illustrated in FIG. 1, the SSPs 30, 70 have a plurality of subscriber lines 15 connected thereto. A subscriber line may also be referred to as a calling line. Each SSP serves a designated group of calling lines, and thus, the SSP or switch that serves a particular calling line may be referred to as its serving switch. Each calling line is connected typically to a piece of terminating equipment including a plurality of telephones designated, e.g., as 20, 80. Although telephones are illustrated as the pieces of terminating equipment in FIG. 1, those skilled in the art will understand that such pieces include other telecommunication devices such as facsimile machines, computers, modems, etc.

Pursuant to the preferred embodiment, each active calling line in an AIN is assigned a ten-digit calling line number. In the description of the present invention, the term "calling line number" is used in its generally understood meaning to be the number which is dialed or input by a caller or source to reach a piece of terminating equipment on a calling line associated with the dialed calling line number. A calling line number is commonly referred to as a telephone number or a directory number.

Referring again to FIG. 1, SSPs are interconnected by a plurality of trunk circuits. These are the voice path trunks that interconnect the SSPs to connect communications. The term "communication" or "call" is used herein to include all messages that may be exchanged between caller and called party in the network illustrated in FIG. 1. Each of the SSPs 30, 70 is connected to another type of AIN element referred to as a local signal transfer point (STP) 24 via respective data links 29. In one embodiment, these are data links employing a signaling protocol referred to as Signaling System 7 (SS7), which is well known to those skilled in the art. Much of the intelligence of the AIN resides in yet another type of AIN element referred to as a local service control point (SCP) 50 that is connected to STP 24 over an SS7 data link. Among the functions performed by the SCP 50 is the maintenance of network databases and subscriber databases, which may be stored in data storage object 40. Data storage object 40 is shown as a database communicatively coupled to SCP 50, although data storage object 40 may be embodied as a component within SCP 50, such as an internally-mounted hard disk device. The databases stored in data storage object 40 may be used in providing temporary telecommunications services to a customer. Typically, the SCP 50 is also the repository of service package applications (SPAs) 35 that are used in connection with or as part of the databases or other storage devices in the application of telecommunication services, enhanced features, or subscriber services to calling lines.

A set of triggers may be defined at the SSPs. A trigger in the AIN is an event associated with a particular calling line that generates a packet to be sent to an SCP. The trigger causes the SCP to query its database for processing instructions with respect to the particular call. The results of the database inquiry are sent back to the SSP in a response from the SCP 50 through the STP 24. The return packet includes instructions to the switch as to how to process the call. The instructions may be to take some special action as a result of a customized calling service, enhanced feature, or subscriber service. In response, the switch moves through its call states, collects the called digits, and generates further packets that are used to set up and route the calls. Similar devices for routing calls among various local exchange carriers are provided by regional STP and regional SCP.

The AIN may also include a service circuit node 32 (SCN), which may also be referred to herein as a service node. The SCN 32 includes voice and dual tone multi-frequency (DTMF) signal recognition devices and voice synthesis devices. In addition, the SCN 32 may include a data assembly interface. The SCN 32 is connected to the local SCP 50 via data links using an X.25 protocol. In addition, the SCN 32 typically is connected to one or more (but usually only a few) SSPs via Integrated Service Digital Network (ISDN) links.

Thus, each telephone set (e.g., caller 20 and subscriber 80) is connected via a telephone line 15 (e.g., POTS, or similar) to a telephone system including central office switches 30, 70, at least one STP 24, and at least one SCP 50. The SCP 50 contains control logic and feature data, and is a centralized node in the system. A SPA 35 processes calls and is running on the SCP 50. Each central office switch 30, 70 may be connected to a plurality of subscriber sets. Additionally, the SCP 50 may provide routing instructions to a plurality of central offices. Connections 29 between the central offices 30, 70, the STP 24, and the service control point 50 are preferably TCP/IP high speed network connections (e.g., fiber optic, ethernet, etc.).

A Personalized Caller ID Service

A personalized caller ID service may be implemented within the AIN infrastructure described above. In a conventional caller ID service, the party subscribed to the service installs a caller ID display device on his or her telephone line. When an incoming call is terminated to the subscriber's line, the caller ID device is generally provided with information including: (1) the telephone number of the calling party's telephone station (the "CgPN" field); and (2) the name associated with that telephone station (the "CNAM" field). These two pieces of information are displayed at the subscriber's caller ID device at the time the call is terminated to the subscriber's line so that the subscriber can decide whether or not to answer the phone.

In a personalized caller ID service according to the invention, the caller may cause the CNAM field to be replaced with a personalized text string by entering a personal identification number (PIN). When a telephone customer enrolls in the personalized caller ID service, a PIN is selected by, or assigned to, the customer, and the customer selects a text string to be stored in a database along with the PIN. When a call is placed to the customer's telephone, the caller is given the opportunity to enter a PIN. If the PIN entered matches the PIN stored in the database, then the CNAM field is replaced with the text string from the database. Such a technique may be used when the customer wishes to call his or her own phone from a remote location and also wishes the caller ID device to indicate that the call is coming from the customer rather than from a stranger. For example, the subscriber's children may have been instructed not to answer the phone for unknown numbers when they are at home alone; in this case, the text string "Mom is calling" might be used to indicate to the customer's children that they may answer the phone even though they do not recognize the calling party number.

Figure 2:
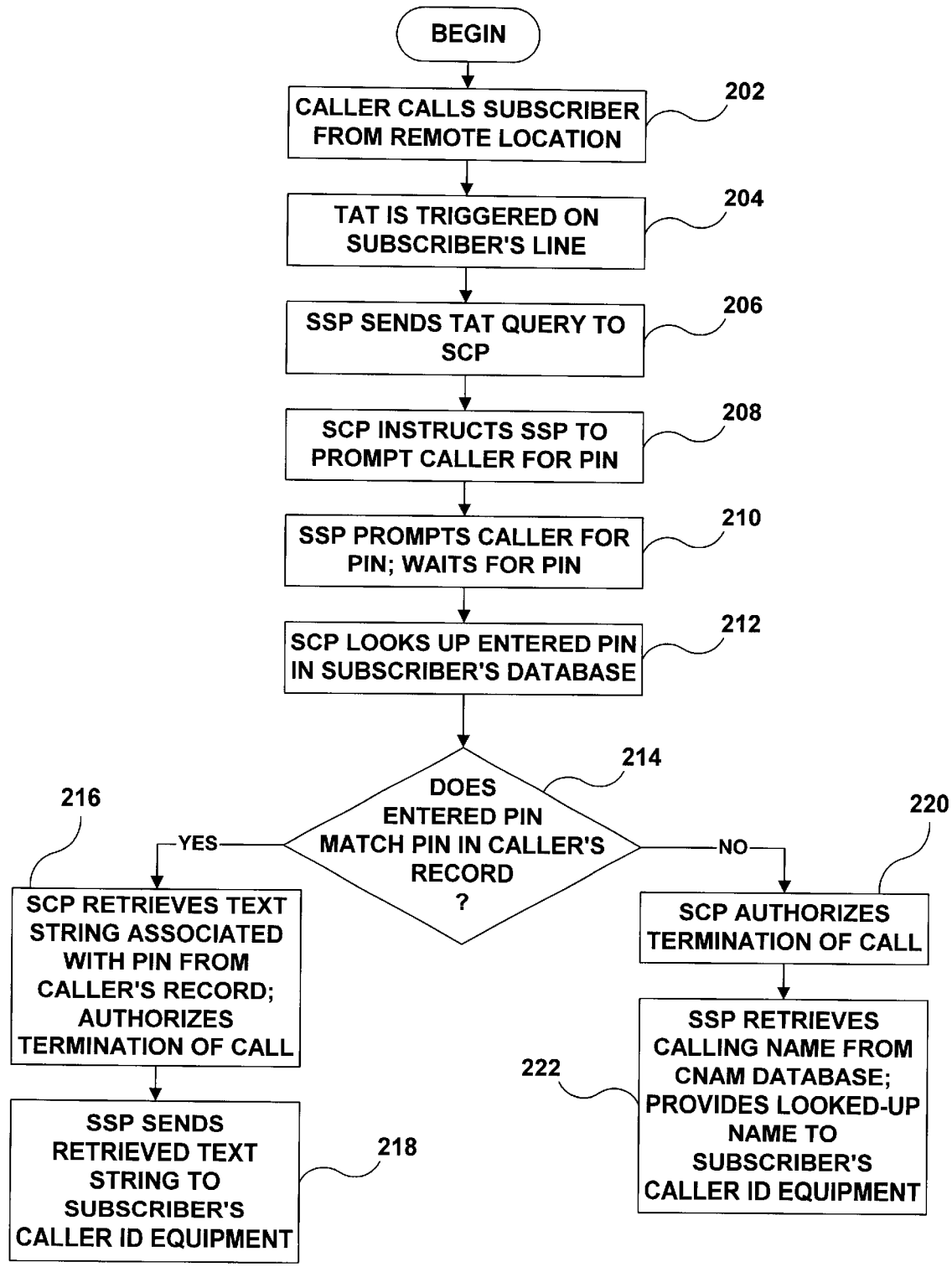
FIG. 2 is a flow diagram of an exemplary call processing method for a subscriber of a personalized caller ID service in accordance with aspects of the invention.

Referring now to FIG. 2, there is shown a method of processing a call from a first telephone station to a second telephone station, where the second telephone station is subscribed to a personalized caller ID service. At step 202, the caller calls the subscriber from a remote telephone station. The remote telephone station may, for example, be a payphone, a hotel, a dentist's office, another person's home, etc. In a typical case, the caller is the subscriber calling his own phone. As indicated above, a particularly advantageous use of a personalized caller ID service is to allow the subscriber to use his caller ID equipment to indicate that he is calling his own phone from a remote location—e.g., as in the example where the personalized caller ID service is used to let the subscriber's children know that "Mom is calling." However, the caller may be anyone without departing from the spirit and scope of the invention. For example, the caller may be a trusted friend who has been given the PIN.

When the subscriber subscribes to the personalized caller ID feature, a termination attempt trigger (TAT) 71 is provisioned on SSP 70. (Components of an advanced intelligent network—i.e., SSP, SCP, SN, etc.—are discussed with reference to their numbering in FIG. 1.) TAT 71 is triggered by any call to the subscriber's number. Thus, at step 204, TAT 71 is triggered in response to the placing of a call to the subscriber. TAT 71 causes a TAT query to be sent to the SCP 50 (step 206). SCP 50, in response to the query, determines that the subscriber has subscribed to the personalized caller ID service and instructs SSP 70 to prompt the caller to enter a PIN (step 208). In response to this instruction, SSP generates a prompt and waits for the caller to enter a PIN (step 210).

The prompt that is generated at step 210 may take many forms. Preferably, the prompt includes some audio. More preferably, the prompt is simply the normal ringing sound that a calling party hears while waiting for a called party to answer the phone. A prompt such as "Please enter a valid PIN" is not likely to integrate as smoothly into the telephone system, because the TAT will trigger when anyone—friends, co-workers, etc.—calls the subscriber, and thus no one will be able to call the subscriber without hearing such a message. By making the prompt a simple ringing tone, the prompt integrates transparently into the normal flow of a call. When a caller calls the subscriber, he or she will hear the usual ringing sound. As discussed below, if the caller does not enter a PIN at this time, the call will be terminated to the subscriber's line, which is the result that a caller expects when the caller is unaware of the personalized caller ID service. Thus, callers need not be aware that the ringing sound is actually a prompt to enter a PIN. When the subscriber calls his or her own number, however, he or she will understand that the ringing sound is a prompt to enter the PIN.

In general, the SSP waits for a dual-tone multi-frequency (DTMF) PIN. DTMF is a particularly convenient way to enter a PIN from a telephone station. However, the PIN may be entered by any means (e.g., clicks on a conventional dial, voice recognition, etc.) without departing from the spirit and scope of the invention. Upon entry of the PIN, an audible confirmation may be generated. For example, the system may generate a "beep" tone as a confirmation that a PIN has been entered. The "beep" may be generated immediately after its entry in order to confirm that the system has received a PIN. Alternatively, the beep may be generated after the PIN has been looked-up in the database as a confirmation that a valid PIN has been entered.

Returning to FIG. 2, at step 212, SCP 50 looks up the entered PIN in the subscriber's record. As discussed above, SCP 50 may include, or be associated with, a database 40, which maintains records relating to callers on the network. In particular, database 40 includes a record for each subscriber (indexed, e.g., by the subscriber's telephone number), where each record includes a PIN and a text message. The text message, as noted above, is the message that is displayed in the CNAM field on the subscriber's caller ID equipment when the PIN is entered. In a typical embodiment, each subscriber has only one PIN and one text message. In an alternative embodiment, the subscriber could have plural PINs, where each PIN corresponds to a different text message. (E.g., when the subscribed phone belongs to a family, the family could have a first PIN corresponding to the text message "Mom is calling" and a second PIN corresponding to the text message "Dad is calling." Thus, the caller could display a different message on the caller ID equipment by entering a different PIN.)

At step 214, a determination is made as to whether the PIN entered at step 208 matches the PIN (or one of the PINs) in the database record for the subscriber's number. If the entered PIN matches, then SCP 50 retrieves, from the subscriber's database entry, the text string associated with that PIN (step 216). SCP 50 then terminates the call to the subscriber's line and sends the retrieved text string to the subscriber's caller ID equipment (step 218). Preferably, the text string is inserted in the CNAM field of the data structure that is transmitted to the subscriber's caller ID equipment. If step 214 results in a determination that the entered PIN does not match the PIN (or any of the PINs) associated with the subscriber's number, then SCP 50 authorizes termination of the call to the subscriber's line (step 220). SSP 50 then retrieves the name (i.e., the CNAM value) associated with the caller's telephone station, and provides this name to the subscriber's caller ID equipment when terminating the call (step 222). The case where no PIN is entered is treated the same as the case where an incorrect PIN is entered: the call is terminated to the subscriber's line with the name associated with the calling party's line begin transmitted to the subscriber's caller ID equipment.

It should be observed that, when call processing is performed in an AIN, at the time a call is terminated, the called party is provided with a data structure that includes the directory number of the calling party (CgPN) and the name associated with the calling party's telephone station (CNAM). Thus, the provision of either the record name (at step 222), or the personalized text message (at step 218), may be performed simply by inserting either of those values into the CNAM field of that data structure, whereupon the data structure is transmitted via TR-30, ISDN. However, it should be appreciated that an AIN is merely one system for call processing, and the textual data (name or personalized message) may be provided to the subscriber's telephone station in an manner without departing from the spirit and scope of the invention.

Figure 3:
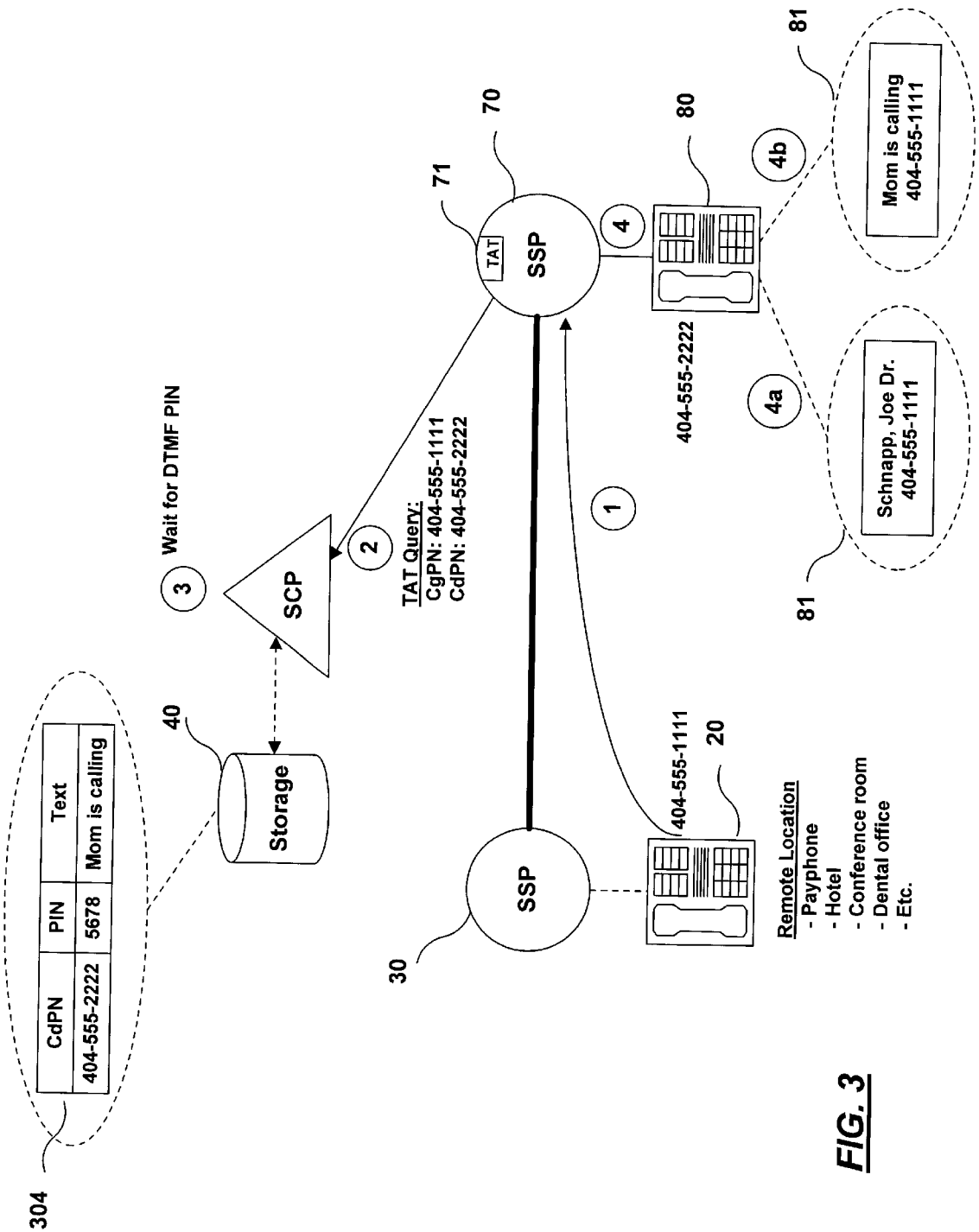
FIG. 3 is a block diagram showing various components of the telephone network of FIG. 1, and the flow of a call through those elements in accordance with the personalized caller ID service of the present invention.

The processing of a call using the personalized caller ID service is now described with particular reference to the elements of an AIN in connection with FIG. 3. Referring now to FIG. 3, a caller places a call (indicated by arrow "1") at telephone station 20. For the purpose of the example, the directory number of calling station 20 is 404-555-1111. The call is placed to the subscriber's calling station 80, which, for the purpose of this example, has directory number 404-555-2222. The call travels through SSP 30 to SSP 70. Because SSP 70 is the central office that services subscriber calling station 80, and because the subscriber has subscribed to enhanced services such as caller ID and personalized caller ID, a TAT 71 is provisioned on SSP 70, which actuates whenever a call is placed to the subscriber's line.

Upon actuation of TAT 71, SSP 70 sends a query (indicated by arrow "2") up to SCP 50. The query is in a format which includes fields for a calling party number ("CgPN") and a called party number ("CdPN"). In this example, CgPN=404-555-1111 and CdPN=404-555-2222. SCP 70 then determines that the personalized caller ID service has been provisioned for subscriber 80's line. Thus, SCP 70 instructions the SSP to prompt the caller for a DTMF PIN. As noted above, the DTMF PIN is entered by the caller using the touch-tone keys on telephone station 20, and the "prompt" may simply be the ringing tone that is normally used when a caller is waiting for the called party to answer. During the time that SSP is prompting for a PIN, SCP 50 waits for the PIN to be collected (indicated by "3").

After the PIN digits have been collected, they are transmitted from SSP 70 to SCP 50. SCP then performs a lookup in database 40. Database 40 is shown as being a separate component connected to SCP 50 but, alternatively, database 40 may be included within SCP 50.

Database 40 contains entries for each subscriber of the personalized caller ID service. An exemplary entry 304 is shown for subscriber 80. The entry includes the following fields having values as indicated:

| FIELD | VALUE |
| --- | --- |
| CdPN | 404-555-2222 |
| PIN | 5678 |
| Text | "Mom is calling" |

Figures 4, 5:
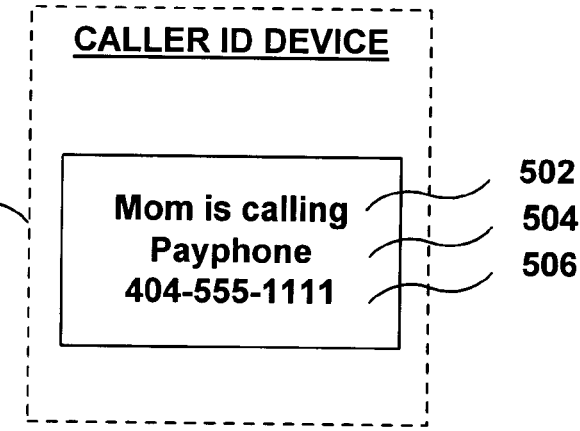
FIG. 4 is a diagram of information stored in a database in accordance with an aspect of the invention.
FIG. 5 is a diagram of an enhanced caller ID device for use with the invention.

Thus, by comparing the entered PIN against database entry 304, SCP 50 determines: (1) whether the correct PIN has been entered, and (2) the text message associated with that PIN. It should be noted that the exemplary database entry shows one PIN and one text message for the subscriber. However, database 40 could include several entries for the subscriber, where each entry stores a different PIN and a different text message. Thus, the caller could enter a different PIN depending on which text message he wanted to display. FIG. 4 shows an alternative exemplary database entry 304*a*, which includes plural PINs for the same subscriber number. In the example of FIG. 4, each member of a family ("Mom", "Dad", "Rhonda", and "Daniel") each have their own PIN, so that each can display their own text message when calling from a remote location.

Returning now to FIG. 3, it should be observed that the comparison of the entered PIN against the PIN (or PINs) in database 40 can result in two possibilities (represented in FIG. 2 as decisional step 214). Either (1) a PIN is entered that matches a PIN in database entry 304, or (2) no PIN is entered (or, equivalently, an incorrect PIN is entered that does not match any PIN in database 40). In either case, SCP 50 authorizes SSP 70 to terminate the call to the subscriber's line. If a valid PIN is entered (case "4(*a*)" in FIG. 3), then the text retrieved from database 40 is entered in the CNAM field of the data delivered to subscriber 80 when the call is terminated. On the other hand, if no PIN (or an invalid PIN) is entered (case "4(*b*)" in FIG. 3), then the CNAM information associated with the caller's line is retrieved and is provided in the CNAM field of the delivered data. Thus, as shown in the drawing, in case "4(*a*)", subscriber 80's caller ID equipment 81 displays the calling party number ("404-555-1111") and the CNAM associated with that calling party ("Dr. Joe Schanpp", in the example). In case "4(*b*)," subscriber 80's caller ID equipment 81 displays the calling party number as in case "4(*a*)", but displays the text retrieved from the database "Mom is calling," rather than the CNAM information associated with the calling party number.

While the invention may be used with a conventional caller ID device 81, as shown in FIG. 3, it may be useful to provide an enhanced caller ID device 81*a*, as shown in FIG. 5. As noted above, when a conventional caller ID device 81*a* is used, the personalized text associated with a particular PIN is provided in the CNAM field of the data that is provided to the subscriber's line when the call is terminated. Thus, the personalized text replaces the CNAM value for the calling party number. When an enhanced caller ID device 81*a* is used, then the personalized text string may be provided along with the CNAM data from the database. Thus, an enhanced caller ID device can display both the name associated with the calling party's telephone station 504 (e.g., "Payphone") and directory number 506 (e.g., "404-555-1111"), as well as the personalized caller ID string 502 (e.g., "Mom is calling").

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method of identifying a call from a first telephone station to a second telephone station comprising the acts of:

intercepting said call before said call is terminated to said second telephone station;

receiving an identification number from said first telephone station;

providing, to said second telephone station, a text string based on said identification number, the text string being durably associated with said second telephone station so as to be available to provide to said second telephone station only when said call is terminated to said second telephone station and not when said call is terminated to a telephone station other than said second telephone station.

2. The method of claim 1, further comprising the act of:

querying a database to retrieve said text string, said text string being indexed in said database based on said identification number.

3. The method of claim 2, further comprising the acts of:

retrieving a record from said database, the retrieved record being associated with said second telephone station; and retrieving a text string from the retrieved record, said text string being identified in the retrieved record based on said identification number.

4. The method of claim 1, wherein said text string is further indexed in said database based on the directory number of said first telephone station.

5. The method of claim 1, wherein a party operating said first telephone station provides said identification number using a touch tone device on said first telephone station.

6. The method of claim 1, further comprising the act of:
terminating said call to said second telephone station after receiving said identification number.

7. The method of claim 1, further comprising the act of:
creating a data structure having a name field; and
inserting said text string into the name field of said data structure; and wherein said providing act comprises:
transmitting said data structure to said second telephone station.

8. The method of claim 1, further comprising the act of:
determining that said identification number is associated with said second telephone station.

9. The method of claim 1, further comprising the act of:
generating a ringing tone while said identification number is being provided.

10. The method of claim 1, further comprising the act of:
generating an audible confirmation following the receipt of said identification number.

11. A system for processing a call from a first telephone station to a second telephone station comprising:
a first node communicatively connected to said first telephone station and said second telephone station, said first node hosting a trigger which actuates when a call is placed from said first telephone station destined for said second telephone station; and
a second node communicatively connected to said first node, said second node comprising or communicating with a database which stores a text string and an identification number indexed by a directory number associated with said second telephone station, wherein said second node includes:
logic which instructs said first node to prompt said first telephone station to enter a number;
logic which looks up said text string in said database based on said directory number; and
logic which instructs said first node to provide said text string to said second telephone station according to whether the entered number matches the identification number in said database, said logic instruction said first node to provide said text string to said second telephone station only if said call is terminated to said second telephone station, and not if said call is terminated to a telephone station other than said second telephone station.

12. The system of claim 11, further comprising a third node, said first telephone stating being communicatively connected to said first node through said third node.

13. The system of claim 11, wherein said database stores a plurality of text string and identification number pairs, each of the plurality of pairs being indexed by said directory number, and wherein said second node further includes:
logic which selects a particular one of said text strings from said database according to the entered number.

14. A caller ID device adapted to be used with a telephone line subscribed to a personalized caller ID service, said caller ID device comprising:
a display comprising a first field which displays the directory number of a calling party telephone station, a second field which displays a name associated with said directory number, and a personalized text string associated with a caller who places a call from said calling party telephone station, said personalized text string further being associated with the telephone line, said personalized text string being retrieved from a data store arrangement that provides said personalized text string for display on a caller ID device only when a call is terminated to said telephone line, and not when a call is terminated to any line other than said telephone line; and
a telephone line interface which communicatively connects said caller ID device to said telephone line.

15. In an advanced intelligent network comprising a service switching point communicatively coupled to a first telephone station and a second telephone station, said service switching point hosting a termination attempt trigger which actuates when a call is placed to said second telephone station, a method of processing a call from said first telephone station to said second telephone station, comprising the act of:
actuating said termination attempt trigger;
said service switching point transmitting a prompt to said first telephone station;
said service switching point receiving an identification number from said first telephone station;
said service switching point querying a database to retrieve a text string associated with said identification number and with said second telephone station, said database providing said text string only when a call is being terminated to said second telephone station and not when a call is being terminated to any telephone station other than said second telephone station; and
transmitting the retrieved text string to said second telephone station.

16. The method of claim 15, wherein the act of transmitting a prompt comprises generating a ringing tone.

17. The method of claim 15, where the act of receiving an identification number from said first telephone station comprises waiting for DTMF input.

18. The method of claim 15, wherein said advance intelligent network further comprises a service control point which hosts or is associated with said database, wherein said method further comprises the acts of:
notifying said service control point that said termination attempt trigger has been actuated;
said service control point instructing said service switching point to prompt said first telephone station for input;
and wherein said act of querying a database comprises:
said service switching point providing said identification number to said service control point;
said service control point retrieving the text string from said database and providing the text string to said service switching point.

19. The method of claim 15, wherein said service switching point transmits a data structure to said second telephone station when terminating a call at said second telephone station, said data structure comprising a CNAM field which stores a name associated with said first telephone station, said second telephone station having a caller ID device associated therewith which displays said CNAM field when a call is terminated to said second telephone station, and wherein said act of transmitting said text string comprises:
inserting the name in said CNAM field with said text string.

20. The method of claim 15, wherein the connection between said first telephone station and said service switching point comprises a second service switching point.

21. In an advanced intelligent network comprising a service switching point communicatively coupled to a first telephone station and a second telephone station, said service switching point being further coupled to a service control point associated with a database which stores data, the improvement comprising:

a data structure stored in said database which contains a text string indexed by an identifying number and a directory number associated with said second telephone station;

logic stored at said service control point which retrieves said text string based on said identifying number and said directory number, which communicates said text string to said service switching point, and which instructs said service switching point to provide said text string to said second telephone station upon termination of a call to said second telephone station, but not upon termination of said call to a telephone station other than said second telephone station.

22. In the advanced intelligent network of claim 21, the further improvement comprising:

logic stored at said service control point which instructs said service switching point to prompt said first telephone station to enter a number, and which compares the entered number with said identifying number with the entered number.

* * * * *

UNITED STATES PATENT AND TRADEMARK OFFICE
CERTIFICATE OF CORRECTION

PATENT NO. : 6,771,755 B1
DATED : August 3, 2004
INVENTOR(S) : Anita Hohans

It is certified that error appears in the above-identified patent and that said Letters Patent is hereby corrected as shown below:

Column 1,
Line 48, beginning at "the SCP looks" after "the" insert:
-- subscriber's record in the database and compares the entered PIN to the PIN listed in the database. If the entered PIN matches the PIN in the database, the subsciber's personalized message is inserted into the CNAM field of the data that is transmitted to the subscriber's caller ID equipment, so that the personalized message may be displayed on the caller ID equipment.
Other features of the invention are described below. --.

Column 2,
Line 16, after "prior art" delete text beginning with "subscriber's record" ending with "Other features of the invention are described below.".

Signed and Sealed this

Twenty-seventh Day of December, 2005

JON W. DUDAS
*Director of the United States Patent and Trademark Office*

UNITED STATES PATENT AND TRADEMARK OFFICE
CERTIFICATE OF CORRECTION

PATENT NO. : 6,771,755 B1
APPLICATION NO. : 09/727321
DATED : August 3, 2004
INVENTOR(S) : Anita Hogans Simpson It is certified that error appears in the above-identified patent and that said Letters Patent is hereby corrected as shown below:

Columns 1-12 should be deleted to appear as per attached columns 1-12.

Signed and Sealed this

Twenty-seventh Day of June, 2006

JON W. DUDAS
*Director of the United States Patent and Trademark Office*

PERSONALIZED CALLER IDENTIFICATION IN A TELEPHONE NETWORK

FIELD OF THE INVENTION

The present invention relates generally to the field of telephony, and, more particularly, to a system and method for providing a personalized caller identification service.

BACKGROUND OF THE INVENTION

Caller identification ("caller ID") services allow a called party to determine the source of the call before answering the telephone. In order to use a caller ID service, a customer of a telephone network subscribes to the caller ID service and purchases caller ID equipment. When a call is terminated at the subscriber's line, the network provides data which includes the directory number of the line from which the call originated, and the record name of the party associated with that number. By using such a service, the subscriber is able to decide whether or not to answer the phone based on who is calling.

While caller ID services are useful tools for screening calls (e.g., unwanted sales calls), the disadvantage of such systems is that they are predicated on the assumption that the caller can always be identified by the particular telephone station from which he or she places the call. This assumption does not hold in the case where a caller places a call at a payphone, a hotel, or other location that is unlikely to be familiar to the calling party. For example, parents may instruct their children not to answer the phone for strangers. However, if a parent attempts to call the children from an unknown location (e.g., a payphone), the children will conclude (incorrectly) that a stranger is calling, and will not answer the phone.

In view of the foregoing, there is a need for a caller ID system and method that overcomes the drawbacks of the prior art.

SUMMARY OF THE INVENTION

The present invention provides a personalized caller ID service in which a subscriber may identify himself when he calls his own telephone number from a remote location, so that an indication of the subscriber's identity may be displayed on the subscriber's caller ID equipment. When a subscriber to the service calls his own telephone number, he enters a personal identification number (PIN) during the ringing tone. Entry of the PIN causes the system to retrieve a personalized message from data storage and to transmit that message to the subscriber's caller ID equipment at the time the call is terminated to the subscriber's line. For example, the message may read "Dad is calling." Thus, when a subscriber calls his children at home from a payphone and enters his PIN, instead of seeing the calling number identified as "payphone" the children will see that "Dad is calling," and thus will know that it is safe to answer the phone.

The message that is displayed in response to the PIN is preferably a personalized message that is selected by the subscriber at the time that he subscribes to the personalized caller ID service. The PIN is either selected by the subscriber or assigned by the telephone network provider. A database stores a record for the subscriber's directory number, which contains a correlation between the PIN and the personalized text message.

When the invention is implemented in an advanced intelligent network (AIN), a termination attempt trigger (TAT) may be provisioned on the subscriber's line at a service switching point (SSP) that services the subscriber's line. Whenever a call is placed to the subscriber's line, the TAT triggers a query to a service control point (SCP) which hosts the database that maintains the list of PINs and messages. The SCP determines that the personalized caller ID service is provisioned for the subscriber and instructs the SSP to generate an audio prompt for a DTMF (dual-tone multi-frequency) PIN. The prompt may comprise the familiar ringing tone, thus allowing the prompt to be transparent to third-party callers who are unaware that the subscriber uses the personalized caller ID service. If the subscriber is calling his own number, he may enter his PIN using the touch-tone keypad at the telephone station. When the PIN is received, the SCP looks up the subscriber's record in the database and compares the entered PIN to the PIN listed in the database. If the entered PIN matches the PIN in the database, the subscriber's personalized message is inserted into the CNAM field of the data that is transmitted to the subscriber's caller ID equipment, so that the personalized message may be displayed on the caller ID equipment.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 1 is a block diagram of an exemplary telephone network in which aspects of the invention may be implemented;

FIG. 2 is a flow diagram of an exemplary call processing method for a subscriber of a personalized caller ID service in accordance with aspects of the invention;

FIG. 3 is a block diagram showing various components of the telephone network of FIG. 1, and the flow of a call through those elements in accordance with the personalized caller ID service of the present invention;

FIG. 4 is a diagram of information stored in a database in accordance with an aspect of the invention; and FIG. 5 is a diagram of an enhanced caller ID device for use with the invention.

DETAILED DESCRIPTION OF PREFERRED EMBODIMENTS

Overview of an Exemplary Telephone Network

Referring now to the figures, a preferred embodiment of the system and method of the present invention will be described. Basic telephony concepts and terminology are used throughout the description as would be understood by one of skill in the art.

Referring now to FIG. 1, there is shown an exemplary telecommunications network 10 that connects a call between a caller 20 and a subscriber 80 in accordance with the present invention. This exemplary environment is the public switched telecommunications network (PSTN). A portion of the PSTN is illustrated in FIG. 1 and generally described below.

In particular, the detailed portion of the PSTN illustrates a part of the AIN of a typical local exchange carrier. For brevity, only a basic explanation of the PSTN is provided herein. Where the PSTN operates or is composed differently in an important aspect from that which would be understood by those skilled in the art, additional details are provided herein. For further information regarding the referenced PSTN and AIN aspects thereof, the interested reader is referred to the patent to Weisser, U.S. Pat. No. 5,430,719, which is incorporated herein by reference.

The AIN includes a variety of interconnected network elements. A group of such network elements includes the plurality of central offices 30, 70 which are service switching points (SSPs). A central office or SSP is a switch and the terms are used interchangeably herein. As further illustrated in FIG. 1, the SSPs 30, 70 have a plurality of subscriber lines 15 connected thereto. A subscriber line may also be referred to as a calling line. Each SSP serves a designated group of calling lines, and thus, the SSP or switch that serves a particular calling line may be referred to as its serving switch. Each calling line is connected typically to a piece of terminating equipment including a plurality of telephones designated, e.g., as 20, 80. Although telephones are illustrated as the pieces of terminating equipment in FIG. 1, those skilled in the art will understand that such pieces include other telecommunication devices such as facsimile machines, computers, modems, etc.

Pursuant to the preferred embodiment, each active calling line in an AIN is assigned a ten-digit calling line number. In the description of the present invention, the term "calling line number" is used in its generally understood meaning to be the number which is dialed or input by a caller or source to reach a piece of terminating equipment on a calling line associated with the dialed calling line number. A calling line number is commonly referred to as a telephone number or a directory number.

Referring again to FIG. 1, SSPs are interconnected by a plurality of trunk circuits. These are the voice path trunks that interconnect the SSPs to connect communications. The term "communication" or "call" is used herein to include all messages that may be exchanged between caller and called party in the network illustrated in FIG. 1. Each of the SSPs 30, 70 is connected to another type of AIN element referred to as a local signal transfer point (STP) 24 via respective data links 29. In one embodiment, these are data links employing a signaling protocol referred to as Signaling System 7 (SS7), which is well known to those skilled in the art. Much of the intelligence of the AIN resides in yet another type of AIN element referred to as a local service control point (SCP) 50 that is connected to STP 24 over an SS7 data link. Among the functions performed by the SCP 50 is the maintenance of network databases and subscriber databases, which may be stored in data storage object 40. Data storage object 40 is shown as a database communicatively coupled to SCP 50, although data storage object 40 may be embodied as a component within SCP 50, such as an internally-mounted hard disk device. The databases stored in data storage object 40 may be used in providing temporary telecommunications services to a customer. Typically, the SCP 50 is also the repository of service package applications (SPAs) 35 that are used in connection with or as part of the databases or other storage devices in the application of telecommunication services, enhanced features, or subscriber services to calling lines.

A set of triggers may be defined at the SSPs. A trigger in the AIN is an event associated with a particular calling line that generates a packet to be sent to an SCP. The trigger causes the SCP to query its database for processing instructions with respect to the particular call. The results of the database inquiry are sent back to the SSP in a response from the SCP 50 through the STP 24. The return packet includes instructions to the switch as to how to process the call. The instructions may be to take some special action as a result of a customized calling service, enhanced feature, or subscriber service. In response, the switch moves through its call states, collects the called digits, and generates further packets that are used to set up and route the calls. Similar devices for routing calls among various local exchange carriers are provided by regional STP and regional SCP.

The AIN may also include a service circuit node 32 (SCN), which may also be referred to herein as a service node. The SCN 32 includes voice and dual tone multifrequency (DTMF) signal recognition devices and voice synthesis devices. In addition, the SCN 32 may include a data assembly interface. The SCN 32 is connected to the local SCP 50 via data links using an X.25 protocol. In addition, the SCN 32 typically is connected to one or more (but usually only a few) SSPs via Integrated Service Digital Network (ISDN) links.

Thus, each telephone set (e.g., caller 20 and subscriber 80) is connected via a telephone line 15 (e.g., POTS, or similar) to a telephone system including central office switches 30, 70, at least one STP 24, and at least one SCP 50. The SCP 50 contains control logic and feature data, and is a centralized node in the system. A SPA 35 processes calls and is running on the SCP 50. Each central office switch 30, 70 may be connected to a plurality of subscriber sets. Additionally, the SCP 50 may provide routing instructions to a plurality of central offices. Connections 29 between the central offices 30, 70, the STP 24, and the service control point 50 are preferably TCP/IP high speed network connections (e.g., fiber optic, ethernet, etc.).

A Personalized Caller ID Service

A personalized caller ID service may be implemented within the AIN infrastructure described above. In a conventional caller ID service, the party subscribed to the service installs a caller ID display device on his or her telephone line. When an incoming call is terminated to the subscriber's line, the caller ID device is generally provided with information including: (1) the telephone number of the calling party's telephone station (the "CgPN" field); and (2) the name associated with that telephone station (the "CNAM" field). These two pieces of information are displayed at the subscriber's caller ID device at the time the call is terminated to the subscriber's line so that the subscriber can decide whether or not to answer the phone.

In a personalized caller ID service according to the invention, the caller may cause the CNAM field to be replaced with a personalized text string by entering a personal identification number (PIN). When a telephone customer enrolls in the personalized caller ID service, a PIN is selected by, or assigned to, the customer, and the customer selects a text string to be stored in a database along with the PIN. When a call is placed to the customer's telephone, the caller is given the opportunity to enter a PIN. If the PIN entered matches the PIN stored in the database, then the CNAM field is replaced with the text string from the database. Such a technique may be used when the customer wishes to call his or her own phone from a remote location and also wishes the caller ID device to indicate that the call is coming from the customer rather than from a stranger. For example, the subscriber's children may have been instructed not to answer the phone for unknown numbers when they are at home alone; in this case, the text string "Mom is calling" might be used to indicate to the customer's children that they may answer the phone even though they do not recognize the calling party number.

Referring now to FIG. 2, there is shown a method of processing a call from a first telephone station to a second telephone station, where the second telephone station is subscribed to a personalized caller ID service. At step 202, the caller calls the subscriber from a remote telephone station. The remote telephone station may, for example, be a payphone, a hotel, a dentist's office, another person's home, etc. In a typical case, the caller is the subscriber calling his own phone. As indicated above, a particularly advantageous use of a personalized caller ID service is to allow the subscriber to use his caller ID equipment to indicate that he is calling his own phone from a remote location—e.g., as in the example where the personalized caller ID service is used to let the subscriber's children know that "Mom is calling." However, the caller may be anyone without departing from the spirit and scope of the invention. For example, the caller may be a trusted friend who has been given the PIN.

When the subscriber subscribes to the personalized caller ID feature, a termination attempt trigger (TAT) 71 is provisioned on SSP 70. (Components of an advanced intelligent network—i.e., SSP, SCP, SN, etc.—are discussed with reference to their numbering in FIG. 1.) TAT 71 is triggered by any call to the subscriber's number. Thus, at step 204, TAT 71 is triggered in response to the placing of a call to the subscriber. TAT 71 causes a TAT query to be sent to the SCP 50 (step 206). SCP 50, in response to the query, determines that the subscriber has subscribed to the personalized caller ID service and instructs SSP 70 to prompt the caller to enter a PIN (step 208). In response to this instruction, SSP generates a prompt and waits for the caller to enter a PIN (step 210).

The prompt that is generated at step 210 may take many forms. Preferably, the prompt includes some audio. More preferably, the prompt is simply the normal ringing sound that a calling party hears while waiting for a called party to answer the phone. A prompt such as "Please enter a valid PIN" is not likely to integrate as smoothly into the telephone system, because the TAT will trigger when anyone—friends, co-workers, etc.—calls the subscriber, and thus no one will be able to call the subscriber without hearing such a message. By making the prompt a simple ringing tone, the prompt integrates transparently into the normal flow of a call. When a caller calls the subscriber, he or she will hear the usual ringing sound. As discussed below, if the caller does not enter a PIN at this time, the call will be terminated to the subscriber's line, which is the result that a caller expects when the caller is unaware of the personalized caller ID service. Thus, callers need not be aware that the ringing sound is actually a prompt to enter a PIN. When the subscriber calls his or her own number, however, he or she will understand that the ringing sound is a prompt to enter the PIN.

In general, the SSP waits for a dual-tone multi-frequency (DTMF) PIN. DTMF is a particularly convenient way to enter a PIN from a telephone station. However, the PIN may be entered by any means (e.g., clicks on a conventional dial, voice recognition, etc.) without departing from the spirit and scope of the invention. Upon entry of the PIN, an audible confirmation may be generated. For example, the system may generate a "beep" tone as a confirmation that a PIN has been entered. The "beep" may be generated immediately after its entry in order to confirm that the system has received a PIN. Alternatively, the beep may be generated after the PIN has been looked-up in the database as a confirmation that a valid PIN has been entered.

Returning to FIG. 2, at step 212, SCP 50 looks up the entered PIN in the subscriber's record. As discussed above, SCP 50 may include, or be associated with, a database 40, which maintains records relating to callers on the network. In particular, database 40 includes a record for each subscriber (indexed, e.g., by the subscriber's telephone number), where each record includes a PIN and a text message. The text message, as noted above, is the message that is displayed in the CNAM field on the subscriber's caller ID equipment when the PIN is entered. In a typical embodiment, each subscriber has only one PIN and one text message. In an alternative embodiment, the subscriber could have plural PINs, where each PIN corresponds to a different text message. (E.g., when the subscribed phone belongs to a family, the family could have a first PIN corresponding to the text message "Mom is calling" and a second PIN corresponding to the text message "Dad is calling." Thus, the caller could display a different message on the caller ID equipment by entering a different PIN.)

At step 214, a determination is made as to whether the PIN entered at step 208 matches the PIN (or one of the PINs) in the database record for the subscriber's number. If the entered PIN matches, then SCP 50 retrieves, from the subscriber's database entry, the text string associated with that PIN (step 216). SCP 50 then terminates the call to the subscriber's line and sends the retrieved text string to the subscriber's caller ID equipment (step 218). Preferably, the text string is inserted in the CNAM field of the data structure that is transmitted to the subscriber's caller ID equipment. If step 214 results in a determination that the entered PIN does not match the PIN (or any of the PINs) associated with the subscriber's number, then SCP 50 authorizes termination of the call to the subscriber's line (step 220). SSP 50 then retrieves the name (i.e., the CNAM value) associated with the caller's telephone station, and provides this name to the subscriber's caller ID equipment when terminating the call (step 222). The case where no PIN is entered is treated the same as the case where an incorrect PIN is entered: the call is terminated to the subscriber's line with the name associated with the calling party's line begin transmitted to the subscriber's caller ID equipment.

It should be observed that, when call processing is performed in an AIN, at the time a call is terminated, the called party is provided with a data structure that includes the directory number of the calling party (CgPN) and the name associated with the calling party's telephone station (CNAM). Thus, the provision of either the record name (at step 222), or the personalized text message (at step 218), may be performed simply by inserting either of those values into the CNAM field of that data structure, whereupon the data structure is transmitted via TR-30, ISDN. However, it should be appreciated that an AIN is merely one system for call processing, and the textual data (name or personalized message) may be provided to the subscriber's telephone station in an manner without departing from the spirit and scope of the invention.

The processing of a call using the personalized caller ID service is now described with particular reference to the elements of an AIN in connection with FIG. 3. Referring now to FIG. 3, a caller places a call (indicated by arrow "1") at telephone station 20. For the purpose of the example, the directory number of calling station 20 is 404-555-1111. The call is placed to the subscriber's calling station 80, which, for the purpose of this example, has directory number 404-555-2222. The call travels through SSP 30 to SSP 70. Because SSP 70 is the central office that services subscriber calling station 80, and because the subscriber has subscribed to enhanced services such as caller ID and personalized caller ID, a TAT 71 is provisioned on SSP 70, which actuates whenever a call is placed to the subscriber's line Upon actuation of TAT 71, SSP 70 sends a query (indicated by arrow "2") up to SCP 50. The query is in a format which includes fields for a calling party number ("CgPN") and a called party number ("CdPN"). In this example, CgPN=404-555-1111 and CdPN=404-555-2222. SCP 70 then determines that the personalized caller ID service has been provisioned for subscriber 80's line. Thus, SCP 70 instructs the SSP to prompt the caller for a DTMF PIN. As noted above, the DTMF PIN is entered by the caller using the touch-tone keys on telephone station 20, and the "prompt" may simply be the ringing tone that is normally used when a caller is waiting for the called party to answer. During the time that SSP is prompting for a PIN, SCP 50 waits for the PIN to be collected (indicated by "3").

After the PIN digits have been collected, they are transmitted from SSP 70 to SCP 50. SCP then performs a lookup in database 40. Database 40 is shown as being a separate component connected to SCP 50 but, alternatively, database 40 may be included within SCP 50.

Database 40 contains entries for each subscriber of the personalized caller ID service. An exemplary entry 304 is shown for subscriber 80. The entry includes the following fields having values as indicated:

| FIELD | VALUE |
| --- | --- |
| CdPN | 404-555-2222 |
| PIN | 5678 |
| Text | "Mom is calling" |

Thus, by comparing the entered PIN against database entry 304, SCP 50 determines: (1) whether the correct PIN has been entered, and (2) the text message associated with that PIN. It should be noted that the exemplary database entry shows one PIN and one text message for the subscriber. However, database 40 could include several entries for the subscriber, where each entry stores a different PIN and a different text message. Thus, the caller could enter a different PIN depending on which text message he wanted to display. FIG. 4 shows an alternative exemplary database entry 304a, which includes plural PINs for the same subscriber number. In the example of FIG. 4, each member of a family ("Mom", "Dad", "Rhonda", and "Daniel") each have their own PIN, so that each can display their own text message when calling from a remote location.

Returning now to FIG. 3, it should be observed that the comparison of the entered PIN against the PIN (or PINs) in database 40 can result in two possibilities (represented in FIG. 2 as decisional step 214). Either (1) a PIN is entered that matches a PIN in database entry 304, or (2) no PIN is entered (or, equivalently, an incorrect PIN is entered that does not match any PIN in database 40). In either case, SCP 50 authorizes SSP 70 to terminate the call to the subscriber's line. If a valid PIN is entered (case "4(a)" in FIG. 3), then the text retrieved from database 40 is entered in the CNAM field of the data delivered to subscriber 80 when the call is terminated. On the other hand, if no PIN (or an invalid PIN) is entered (case "4(b)" in FIG. 3), then the CNAM information associated with the caller's line is retrieved and is provided in the CNAM field of the delivered data. Thus, as shown in the drawing, in case "4(a)", subscriber 80's caller ID equipment 81 displays the calling party number ("404-555-1111") and the CNAM associated with that calling party ("Dr. Joe Schnapp", in the example). In case "4(b)," subscriber 80's caller ID equipment 81 displays the calling party number as in case "4(a)", but displays the text retrieved from the database "Mom is calling," rather than the CNAM information associated with the calling party number.

While the invention may be used with a conventional caller ID device 81, as shown in FIG. 3, it may be useful to provide an enhanced caller ID device 81a, as shown in FIG. 5. As noted above, when a conventional caller ID device 81a is used, the personalized text associated with a particular PIN is provided in the CNAM field of the data that is provided to the subscriber's line when the call is terminated. Thus, the personalized text replaces the CNAM value for the calling party number. When an enhanced caller ID device 81a is used, then the personalized text string may be provided along with the CNAM data from the database. Thus, an enhanced caller ID device can display both the name associated with the calling party's telephone station 504 (e.g., "Payphone") and directory number 506 (e.g., "404-555-1111"), as well as the personalized caller ID string 502 (e.g., "Mom is calling").

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method of identifying a call from a first telephone station to a second telephone station comprising the acts of:
intercepting said call before said call is terminated to said second telephone station;
receiving an identification number from said first telephone station;
providing, to said second telephone station, a text string based on said identification number, the text string being durably associated with said second telephone station so as to be available to provide to said second telephone station only when said call is terminated to said second telephone station and not when said call is terminated to a telephone station other than said second telephone station.

2. The method of claim 1, further comprising the act of:
querying a database to retrieve said text string, said text string being indexed in said database based on said identification number.

3. The method of claim 2, further comprising the acts of:
retrieving a record from said database, the retrieved record being associated with said second telephone station; and
retrieving a text string from the retrieved record, said text string being identified in the retrieved record based on said identification number.

4. The method of claim 1, wherein said text string is further indexed in said database based on the directory number of said first telephone station.

5. The method of claim 1, wherein a party operating said first telephone station provides said identification number using a touch tone device on said first telephone station.

6. The method of claim 1, further comprising the act of:
terminating said call to said second telephone station after receiving said identification number.

7. The method of claim 1, further comprising the act of:
creating a data structure having a name field; and
inserting said text string into the name field of said data structure;
and wherein said providing act comprises:
transmitting said data structure to said second telephone station.

8. The method of claim 1, further comprising the act of:
determining that said identification number is associated with said second telephone station.

9. The method of claim 1, further comprising the act of:
generating a ringing tone while said identification number is being provided.

10. The method of claim 1, further comprising the act of:
generating an audible confirmation following the receipt of said identification number.

11. A system for processing a call from a first telephone station to a second telephone station comprising:
a first node communicatively connected to said first telephone station and said second telephone station, said first node hosting a trigger which actuates when a call is placed from said first telephone station destined for said second telephone station; and
a second node communicatively connected to said first node, said second node comprising or communicating with a database which stores a text string and an identification number indexed by a directory number associated with said second telephone station, wherein said second node includes:
logic which instructs said first node to prompt said first telephone station to enter a number;
logic which looks up said text string in said database based on said directory number; and
logic which instructs said first node to provide said text string to said second telephone station according to whether the entered number matches the identification number in said database, said logic instruction said first node to provide said text string to said second telephone station only if said call is terminated to said second telephone station, and not if said call is terminated to a telephone station other than said second telephone station.

12. The system of claim 11, further comprising a third node, said first telephone stating being communicatively connected to said first node through said third node.

13. The system of claim 11, wherein said database stores a plurality of text string and identification number pairs, each of the plurality of pairs being indexed by said directory number, and wherein said second node further includes:
logic which selects a particular one of said text strings from said database according to the entered number.

14. A caller ID device adapted to be used with a telephone line subscribed to a personalized caller ID service, said caller ID device comprising:
a display comprising a first field which displays the directory number of a calling party telephone station, a second field which displays a name associated with said directory number, and a personalized text string associated with a caller who places a call from said calling party telephone station, said personalized text string further being associated with the telephone line, said personalized text string being retrieved from a data store arrangement that provides said personalized text string for display on a caller ID device only when a call is terminated to said telephone line, and not when a call is terminated to any line other than said telephone line; and
a telephone line interface which communicatively connects said caller ID device to said telephone line.

15. In an advanced intelligent network comprising a service switching point communicatively coupled to a first telephone station and a second telephone station, said service switching point hosting a termination attempt trigger which actuates when a call is placed to said second telephone station, a method of processing a call from said first telephone station to said second telephone station, comprising the act of:
actuating said termination attempt trigger;
said service switching point transmitting a prompt to said first telephone station;
said service switching point receiving an identification number from said first telephone station;
said service switching point querying a database to retrieve a text string associated with said identification number and with said second telephone station, said database providing said text string only when a call is being terminated to said second telephone station and not when a call is being terminated to any telephone station other than said second telephone station; and
transmitting the retrieved text string to said second telephone station.

16. The method of claim 15, wherein the act of transmitting a prompt comprises generating a ringing tone.

17. The method of claim 15, where the act of receiving an identification number from said first telephone station comprises waiting for DTMF input.

18. The method of claim 15, wherein said advance intelligent network further comprises a service control point which hosts or is associated with said database, wherein said method further comprises the acts of:
notifying said service control point that said termination attempt trigger has been actuated;
said service control point instructing said service switching point to prompt said first telephone station for input;
and wherein said act of querying a database comprises:
said service switching point providing said identification number to said service control point;
said service control point retrieving the text string from said database and providing the text string to said service switching point.

19. The method of claim 15, wherein said service switching point transmits a data structure to said second telephone station when terminating a call at said second telephone station, said data structure comprising a CNAM field which stores a name associated with said first telephone station, said second telephone station having a caller ID device associated therewith which displays said CNAM field when a call is terminated to said second telephone station, and wherein said act of transmitting said text string comprises:
inserting the name in said CNAM field with said text string.

20. The method of claim 15, wherein the connection between said first telephone station and said service switching point comprises a second service switching point.

21. In an advanced intelligent network comprising a service switching point communicatively coupled to a first telephone station and a second telephone station, said service switching point being further coupled to a service control point associated with a database which stores data, the improvement comprising:

a data structure stored in said database which contains a text string indexed by an identifying number and a directory number associated with said second telephone station;

logic stored at said service control point which retrieves said text string based on said identifying number and said directory number, which communicates said text string to said service switching point, and which instructs said service switching point to provide said text string to said second telephone station upon termination of a call to said second telephone station, but not upon termination of said call to a telephone station other than said second telephone station.

22. In the advanced intelligent network of claim 21, the further improvement comprising:

logic stored at said service control point which instructs said service switching point to prompt said first telephone station to enter a number, and which compares the entered number with said identifying number with the entered number.

* * * * *